No. 738,092. PATENTED SEPT. 1, 1903.
W. M. BLACK & H. F. WORRALL.
FRUIT SIZER.
APPLICATION FILED FEB. 28, 1902.
NO MODEL. 3 SHEETS—SHEET 1.
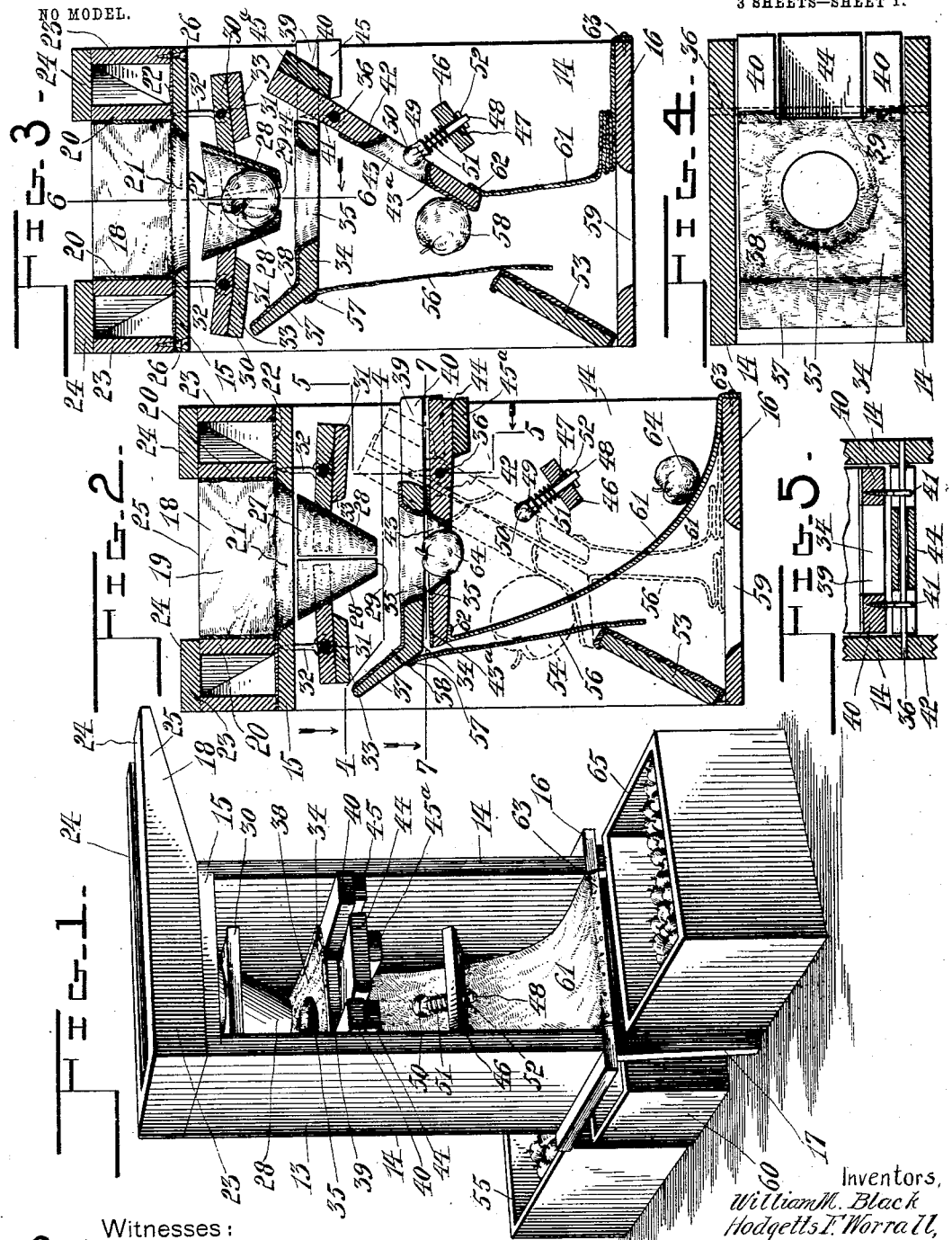
Witnesses:
John F. Deufferwiel
George W. Colles
Inventors,
William M. Black
Hodgetts F. Worrall,
By Marion & Marion
Attorneys No. 738,092. PATENTED SEPT. 1, 1903.
W. M. BLACK & H. F. WORRALL.
FRUIT SIZER.
APPLICATION FILED FEB. 28, 1902.
NO MODEL. 3 SHEETS—SHEET 2.
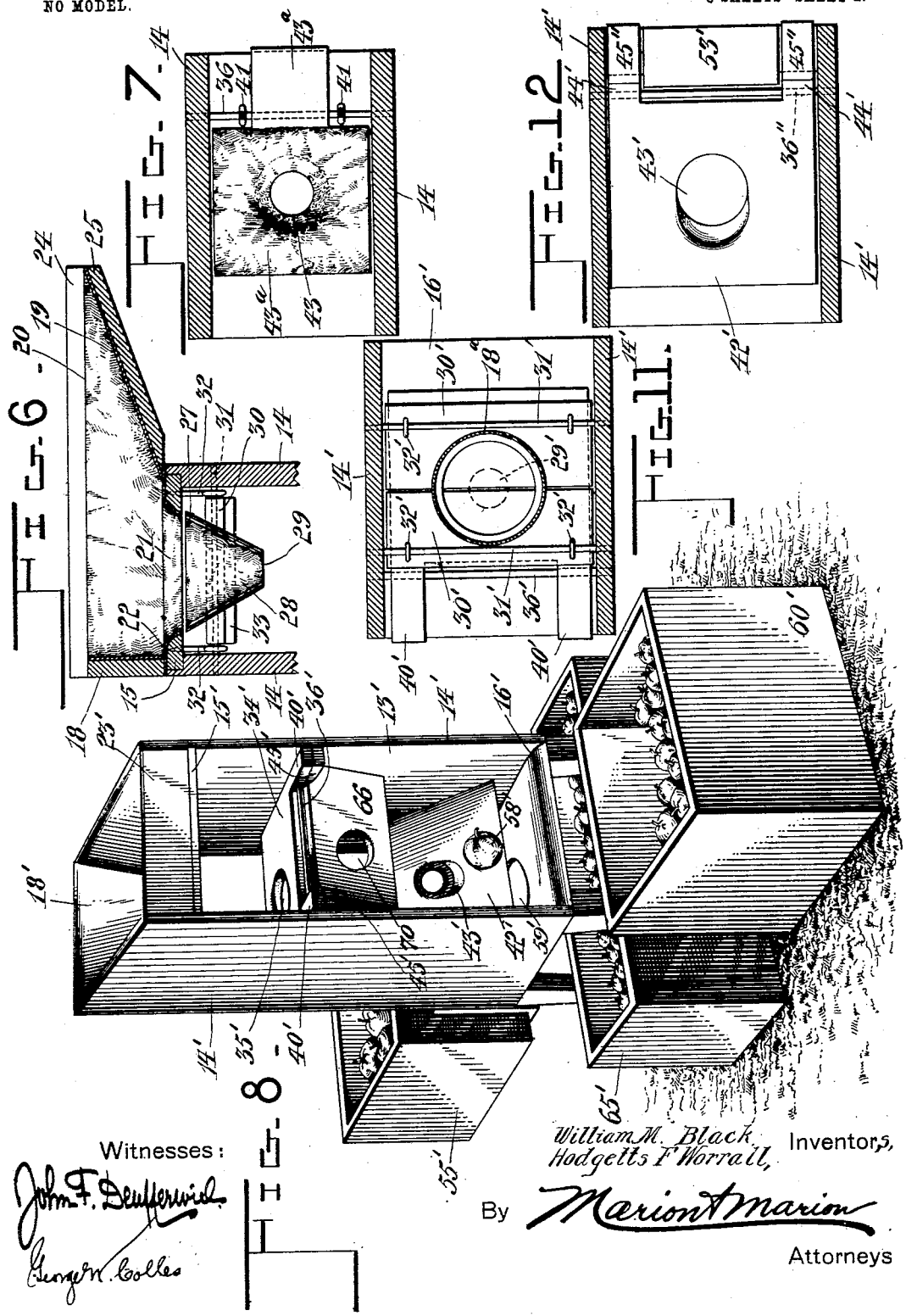
Witnesses:
John F. Deufferwid
George W. Colles
Inventors,
William M. Black,
Hodgetts F. Worrall,
By Marion & Marion
Attorneys No. 738,092. PATENTED SEPT. 1, 1903.
W. M. BLACK & H. F. WORRALL.
FRUIT SIZER.
APPLICATION FILED FEB. 28, 1902.
NO MODEL. 3 SHEETS—SHEET 3.
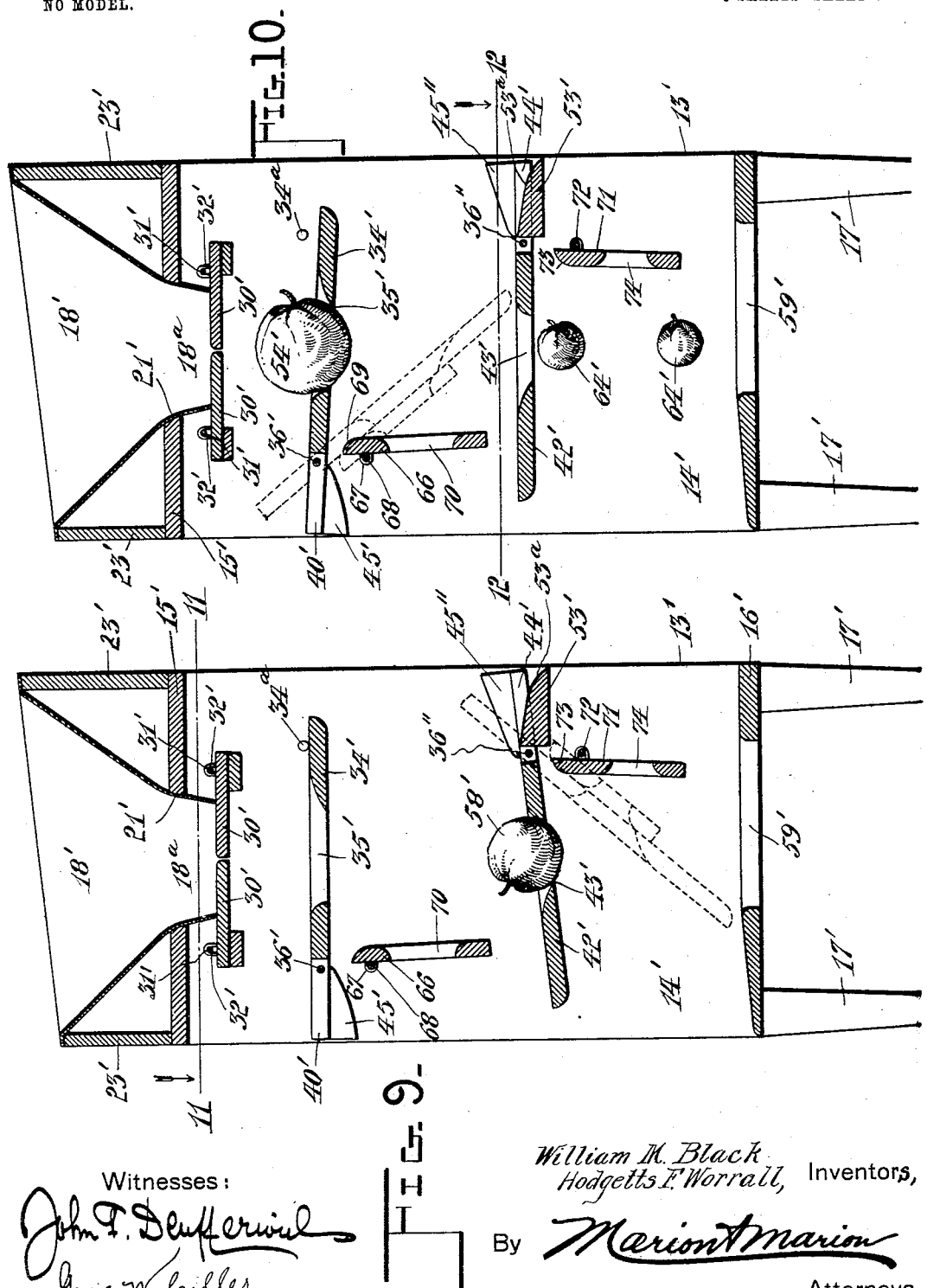
Witnesses:
John T. Deufferwiel
George W. Colles
William M. Black
Hodgetts F. Worrall, Inventors,
By Marion & Marion
Attorneys No. 738,092. Patented September 1, 1903.

UNITED STATES PATENT OFFICE.

WILLIAM MARSHALL BLACK, OF WOLFVILLE, AND HODGETTS FOLEY WORRALL, OF HALIFAX, CANADA; SAID WORRALL ASSIGNOR TO MARY WORRALL, OF HALIFAX, CANADA.

FRUIT-SIZER.

SPECIFICATION forming part of Letters Patent No. 738,092, dated September 1, 1903.

Application filed February 28, 1902. Serial No. 96,040. (No model.)

*To all whom it may concern:*

Be it known that we, WILLIAM MARSHALL BLACK, of Wolfville, county of Kings, and HODGETTS FOLEY WORRALL, of Halifax, county of Halifax, Province of Nova Scotia, Canada, both subjects of the King of Great Britain, have invented certain new and useful Improvements in Fruit-Sizers; and we do hereby declare that the following is a full, clear, and exact description of the invention, such as will enable others skilled in the art to which it appertains to make and use the same.

Our invention relates to an apparatus for sizing or separating fruit of all kinds into different lots or piles according to the sizes thereof, and it is particularly intended for round or approximately spherical fruit, such as apples, oranges, pears, and the like.

The principle on which our improved sizer operates is that of a series of holes of diminishing size through which the fruit falls, being caught by one of the holes according to its size and instead of passing through this hole is ejected therefrom automatically and falls or rolls to one side of the apparatus into an appropriate receptacle placed to receive it.

By our improved sizer the fruit may be assorted into any number of different sizes, as desired, the number of sizes being limited simply by the number of different-sized holes through which it passes, while the smallest fruit, such as will pass through all of the holes, will ordinarily be arranged simply to drop down through the bottom of the device and be caught in a receptacle placed under it in position to catch the fruit.

The principal feature of our improved sizer consists in a series of hinged flaps or boards having holes of graduated size centrally thereof, these flaps or boards being normally retained in horizontal positions by a counterbalance-spring or any appropriate means, with the hole located directly beneath the fall of the fruit, so that the fruit if small enough will pass through said hole, but if too large to pass through its weight will overbalance the board and cause it to tip, whereupon the fruit will roll out of the hole sidewise of the machine into the receptacle appropriate to its particular size.

Another important feature of this invention is the provision of means automatically operated by the tipping of the board for pushing upon the center of the fruit which projects down through the hole and knocking it out of the hole in case, as sometimes happens, the fruit sticks in the hole and does not readily roll out upon the tipping of the board.

Another important feature of our invention which is shown in one form in the annexed drawings is the provision of flexible guideways, which will be ordinarily formed of felt or other soft material, down which the fruit may roll and which by reason of the peculiar attachment thereof are adapted to guide it into its appropriate receptacle.

Still another feature of our invention consists in the provision of a peculiar form of expansible hopper-mouth formed by dividing the mouth of the hopper transversely and mounting the two halves upon pivots at the sides, which are adapted to yield and separate on the passage of the fruit therethrough, so that the fruit of whatever size it may be is invariably caused to fall exactly in the center of the machine and at the same time is lowered gently into proximity with the sizing-boards.

Other features of our invention will appear from the following description and drawings and are particularly set forth in the claims.

We have shown in the accompanying drawings two forms of our improved sizer, each of which has certain advantages and will be adapted to different conditions.

In the drawings, Figure 1 is a perspective view of the first form of sizer complete. Fig. 2 is a vertical central section through the same, showing the mode of operation in dotted lines. Fig. 3 is a similar section taken in the same plane as Fig. 2, showing fruit, such as apples, passing through the sizer. Fig. 4 is a plan view on the line 4 4 of Fig. 2. Fig. 5 is a detail fragmentary section taken on the line 5 5 of Fig. 2. Fig. 6 is a vertical section through the upper part of the hopper, taken on the line 6 6 of Fig. 3, and Fig. 7 is a sectional plan view on the line 7 7 of Fig. 2. Figs. 8 to 12, inclusive, show the second form of the machine, and of these Fig. 8 is a perspective view of the same nature as Fig. 1, Figs. 9 and 10 are vertical central sections through this modified form, showing the mode of operation for different sizes of fruit, Fig. 11 is a horizontal section on the line 11 11 of Fig. 9, and Fig. 12 is a similar section on the line 12 12 of Fig. 10.

The same numerals of reference denote like parts in all the figures of the drawings.

The apparatus, as shown in Fig. 1, consists of a boxing or frame 13, having side boards 14 and top and bottom boards 15 and 16, the sides of the apparatus adjacent to the boards 14 being open, and this frame 13 is supported upon legs 17 and carries on its upper side a trough or hopper 18. This hopper 18 is formed with a sloping feed-board 19, and its sides 20 are formed to converge together to a central aperture 21, formed in the top board 15, and both the sides and bottom of the hopper and the edges of the central aperture, as well as all other portions of the apparatus against which the fruit strikes, are preferably lined with felt 22, as shown. The sides of the hopper, as shown, are constructed in framelike form by means of the parallel boards 23 and top boards 24, joining them to the converging interior boards 20 in order to strengthen the projecting end 25 of the hopper and make the outside thereof even with the sides of the frame 13, although, of course, this construction is not essential to the operation of our device, and the hopper may be secured to the top board 15 of the frame 13 by means of suitable fastenings, such as screws 26. To the under side of the central aperture 21 there is secured a yielding divided hoppermouth 27, which forms a principal feature of our invention, and this hopper-mouth, as shown, is constructed in two lateral halves 28, which together form a truncated cone of a diameter at the upper end equal to the diameter of the orifice 21 and at the lower end having a smaller aperture 29 in general slightly smaller than that of the smallest-sized apple or other fruit which may be used in the machine. These lateral halves 28 are attached to a pair of boards 30, which are pivoted upon transverse horizontal pintles 31, which pintles are suspended in screweyes or eyebolts 32, which are embedded in the top board 15 of the frame, and in order to retain the lateral halves 28 in their closed or uppermost positions, as shown in Fig. 2, the boards 30 are projected outwardly beyond their pivot-points and provided with counterbalance-weights 33, although it will be understood that springs or other suitable yielding means may be substituted. The yielding gate thus formed by the lateral halves 28 of the hopper-mouth 27 thus forms a variable-sized exit for the fruit and serves to keep it and cause it to drop exactly in the center of the hopper and of the series of sizing-holes, to be presently described, no matter what size it may be.

Directly beneath the top board 15 and between the two side boards 14 we provide the first sizing-board 34, which has a central aperture 35, this aperture being slightly smaller than the largest-sized fruit adapted to be sorted in the machine—that is to say, the hole 35 will be of just sufficient size to allow the passage of the second size or intermediate size of fruit, the present machine being adapted to assort the fruit into three different sizes. The sizing-board 34 is hinged upon the transverse pintle 36, extending from side to side of the casing just to the right of the hole, and the left-hand or free end of the board is turned obliquely upward, as shown at 37, this portion being destined to ease the fall of the apple when the board is tipped and cause it to slacken in its movement to prevent it from becoming bruised, and the entire upper side of the board 34 and the edges of the aperture 35 are lined with felt or other soft material 38, as shown. The pintle 36 does not pass through the board 34, but is located below the same, as best indicated in Figs. 2, 3, and 5, the board 34 being deeply recessed at its center, as shown at 39, to a point beyond the pintle to form a pair of tongues 40 on each side of the board, into the lower side of which are screwed a pair of screw-eyes 41, which embrace the pintle and forms the pivots about which the board 34 turns. The purpose of this arrangement is to allow the pintle to form a hinge not simply for the board 34, but also for the second sizing-board 42, which is located directly beneath and when not disturbed in its position will rest in contact with the upper board, as shown in Fig. 2. The second sizing-board 42 is formed with a hole concentric or coaxial with the hole 43 and the center line of the apparatus, but of slightly smaller size, being adapted to catch the second or intermediate size of fruit, but of just sufficient size to allow the passage of the third or smallest size of fruit. This board is likewise lined on its upper surface with felt 43$^a$, and it is provided on its right-hand side with a tongue 44, through which the pintle 36 passes and which is of the same width as the recess 39 in the board 34, so that the board 42 may be tipped or turned about its hinge without interfering with the board 34. The sizing-boards 34 and 42 are provided with counterbalance-weights 45 and 45$^a$, respectively, to the right of the pintle, whereby they will be returned to their normal horizontal positions after the passage of the fruit or whenever tipped, and of course it will be understood that springs or other equivalent means may be substituted for the counterbalances 45 and 45$^a$. Beneath the two sizing-boards and slightly to the right of the center, so as to be nearly under the hinge 36, there is located a transverse bar 46, which is tilted slightly obliquely, so as to face the sizing-boards when the latter are tilted, and there is formed in the center of this bar a transverse hole 47, the thickness of the bar being sufficient to form a guide for a pin 48, which is arranged to reciprocate in the hole 47. The upper end of the pin 48 is formed with a head portion 49, surmounted by a cushioned bumper 50, and between the head 49 and the upper side of the bar 46 is seated a coiled spring 51 under compression, which is adapted to keep the pin 48 in its uppermost position, the latter being retained in its socket by a linchpin 52. In the position assumed by the bumper 50 it is adapted to project into the arc formed by the center of the apertures 35 and 43 of the sizing-boards in their tipping movements, so that when they are tipped to their farthest extent the bumper will pass up through the lower aperture 43 and will abut approximately close to the lower side of the aperture 35. When in this position, the bumper 50 is adapted to strike against the lower projecting side of an apple which may lodge in one of the sizing-apertures, and the slight blow thus administered will be sufficient to dislodge it from the aperture if it should happen to stick therein and cause it to roll out and down the board to its appropriate receptacle by the guiding means, which will now be described. This guiding means is different for the different sizes of apples, and for the first or largest size it consists principally of an oblique guide-board 53, whose upper edge is so located that it will strike the outer oblique edge 37 of the upper sizing-board when the latter is tipped and form a limit for its movement, as shown in dotted lines in Fig. 2, and the apple, which is shown dotted at 54, will thus be caused to roll down the guide-board 34, being slightly checked by the oblique portion 37, and then will roll down the side of the guide-board 53 into the receptacle 55, containing the largest size of fruit, and placed on the side of the casing 13, adapted to receive it. The guide for the second or intermediate size of fruit consists in a flexible flap 56, which may be of felt, rubber cloth, or similar material suspended from the outer edge 37 of the upper sizing-board, as shown at 57, and acting in conjunction with the guide-board 53, the flap 56 being extended to a sufficient length to pass below the board 53 in all positions of the upper sizing-board, and thus the fruit 58, which is caught by the aperture in the second sizing-board 42 and pushed therefrom by the bumper 50, will roll down the side of the board and is prevented from passing over the board 53 and guided by the flap 56 to the large aperture 59, formed in the bottom board slightly to the left of the central line of the casing, through which the fruit drops into the receptacle 60, placed below the casing and between the legs thereof. At the same time said fruit 58 is prevented from accidentally bounding out on the other right-hand side of the hole by a flexible sheet or apron 61, which is attached at one end to the free end of the sizing-board 42, as shown at 62, and at the other to the right-hand outer edge of the bottom board 16, as shown at 63, the sheet 61 extending from side to side of the casing 13 and being of sufficient length so that it will lie in an easy curve between its two points of attachment, as shown in Fig. 2, and thus enable the second sizing-board to assume its normal horizontal position. This sheet 61 performs the double function not simply of preventing the escape of the second-sized fruit 58 from its proper aperture, but also of a yielding guide for the third or smallest sized fruit 64, which, as will be seen from Fig. 2, will drop clean through the aperture 43 and fall onto said sheet and by its slanting position will be guided slowly and yieldingly out on the right-hand side into the receptacle 65 awaiting it. The operation of this form of the machine will now be obvious. The apples or other fruit after being inspected individually for worms, spots, and similar defects are placed one by one in the front end 25 of the hopper 18 and rolling down the board 19 will drop through the aperture 21 into the funnel-shaped doors 28 and will separate these to the desired extent, as indicated in Fig. 3, thence passing exactly centrally downward, and after striking one of the sizing-apertures they will be thrown out into the first or intermediate piles or else passing clean through both holes will drop on the apron 61 and be thrown out into the third pile, as the case may be.

The second form of our improved sizer shown in the drawings differs slightly from the first form in the form and position of the hinged sizing-boards as well as in the means by which the apples catching in the apertures are knocked out and in the position assumed by the different-sized apples being sorted. This form, as shown, consists of a boxing or frame 13', similar in all respects to the frame 13 and having side boards 14' and top and bottom boards 15' and 16', respectively, which have central apertures 21' and 59', similar to the apertures 21 and 59. On the upper side of the top board 15' there is located a conical hopper 18', whose upper edge is slightly slanted for convenience sake, as shown, and this edge is supported by boards 23', forming the frame of the hopper. The hopper 18' has a funnel-shaped neck 18ª depending therefrom and passing through the aperture 21', and on the lower face of the central aperture in the neck there is a pair of flap-boards 30', which cover the opening and may or may not have a central circular opening, as desired, (indicated in dotted lines at 29'.) These flap-boards 30' form doors to guide the apples centrally in falling through the sizing-apertures and are pivoted by means of staples or eyes 32' upon transverse pintles 31', secured at their ends in the side boards 14'. These doors 30', as shown, are simpler in form than the hopper-mouth 27 of the first form, but will serve the purpose sufficiently well for the cheaper grade of apparatus. The first sizing-board 34' is similarly located to the board 34 in the first form, but as herein shown is pivoted on the left instead of on the right of the apparatus upon a transverse pivot 36', which in this case passes through a pair of rearwardly-extending tongues 40', which carry the pivoted counterweights 45', adapted to raise the board and normally keep it pressed in a horizontal position, beyond which it is prevented from being raised by means of a stop-pin 34ª, projecting from one of the side boards 14'. This sizing-board has a central sizing-aperture 35', adapted to catch and hold the largest size of apple 54' and to pass the intermediate size 58' in the same way as the sizing-aperture 35. The second sizing-board 42' is pivoted independently of the first and at a considerable distance below the same sufficient to enable the upper sizing-board to assume the tipped position shown in dotted lines in Fig. 10 without interfering with its action, and this board is formed with a pair of tongues 44', through which passes a transverse pivot 36'', and it carries a pair of counterweights 45'' in all respects similar to the formation of the upper sizing-board 34'; but in addition there is inserted within the recess formed between the two tongues 44' a central guide-board 53', which has an oblique surface 53ª, and on which the largest size of fruit caught in the hole 35' and ejected therefrom are adapted to roll into a receptacle 55', placed in this case upon the right-hand side of the apparatus. The ejecting means for the apples is somewhat different in this form of the device from that shown in the first form, and it consists in the case of the upper sizing-board of a pivoted flap 66, which is suspended by means of staples 67 on a transverse pintle 68, located directly beneath the pintle 36' or slightly to the right thereof, and the flap 66 has an upwardly-projecting lip 69, having a rounded upper surface and extending above the pintle, and it has also a comparatively small hole 70 therein located centrally thereof. The mode of operation of this flap 66 is as follows: When an apple of the first or largest size falls into the hole 35' and tips the board 34', the under side of the latter will strike the lip 69 on its descent and cause the flap to be reversely tilted, so that the board and flap will strike together in the manner shown in dotted lines in Fig. 10, and the lower edge of the hole 70 being slightly inside of the hole 35' the fruit will be sharply ejected from the sizing-aperture and, rolling down the board 34' onto the oblique face 53ª, will pass into the receptacle placed to receive it on the right of the apparatus. In a similar manner is provided beneath the second sizing-board 42' a flap 71, which is pivoted upon the pintle 72 and has an upwardly-extending rounded lip 73 and an aperture 74 therein slightly smaller than the aperture 70 and the sizing-aperture 43', while in all other respects the flap 71 is similarly constructed to the flap 66, and it will be seen that in this form of the device the second size of fruit will be ejected upon the left of the machine into the receptacle 60'. The third size of fruit 64', passing both holes 35' and 43', will drop through the aperture 59' in the bottom board and fall into an appropriate receptacle 65', directly beneath the sizer.

The advantages and points of excellence of our improved fruit-sizer in both its forms hereinabove shown have been already set forth, and it will be seen that we have provided an apparatus which is simply and easily constructed from ordinary materials and of the simplest possible character adapted to perform its work quickly and accurately without getting out of order or injuring the fruit in any way.

From the above description of the several modifications of our invention it will be obvious that it is of a very multifarious scope and pattern and permits of wide modifications according to the varied conditions of use, and it will be understood that we do not limit ourselves to the precise forms shown, because many of the details and arrangement of parts may be changed in form and position without changing the operativeness or utility of our invention and without departing from the principle or spirit thereof, and we therefore reserve the right to make such modifications as lie within the scope of the following claims.

Having now described our invention, what we claim as new, and desire to secure by Letters Patent, is—

1. A fruit-sizer comprising a descending series of plates having apertures diminishing in size downwardly, said plates being yieldingly pivoted on transverse axes at one side of said apertures; and means for normally holding said plates in position to receive the fruits.

2. A fruit-sizer comprising a descending series of plates having apertures arranged substantially in line and diminshing in size downwardly, said plates being yieldingly pivoted on transverse axes at one side of said apertures, and counterweights adapted to hold said plates in normal position until weighted by the fruit.

3. A fruit-sizer comprising a series of pivoted tip-plates having sizing-apertures therein one below the other and coaxial with the aperture in the hopper-bottom, means for yieldingly supporting said plates in a horizontal position, and a hopper with delivery-aperture substantially in line with the apertures in the tip-plates.

4. A fruit-sizer comprising a pivoted yieldable plate having a sizing-aperture therein and adapted to be tipped by the weight of a fruit placed thereon and of a size too large to pass through said aperture, and means for depositing fruit on said plate, and an apron of flexible material attached to the free edge of the plate whereby the fruit is guided into its appropriate receptacle.

5. A fruit-sizer comprising an inclosing casing, a hopper supported on the top thereof and having an aperture in its bottom, boards having graduated sizing-apertures therein and pivotally mounted in the casing below the hopper and having their apertures in line with its discharge-opening, and means for yieldably supporting said boards in a horizontal position.

6. A fruit-sizer comprising a board pivotally mounted on one side, means for yieldably supporting it in a horizontal position, a sizing-aperture in said board, and a stationary ejector located beneath said board in the path of said aperture to strike a fruit and eject it from said aperture when the said board is tipped.

7. A fruit-sizer comprising a casing, a hopper mounted thereon and having an open bottom, a plurality of boards pivotally mounted in said casing below said hopper and having coaxial graduated apertures therein, and an ejector adapted to strike the fruit which catches in said apertures from the lower side when the board is tipped, and means for yieldably holding the board in a horizontal position.

8. A fruit-sizer comprising a casing, a hopper mounted thereon and having an open bottom, a plurality of boards pivotally mounted in said casing below said hopper and having coaxial graduated apertures therein, and an ejector adapted to strike the fruit which catches in said aperture from the lower side when the board is tipped, means for yieldably holding the board in a horizontal position, and means for guiding fruit of different sizes to fall centrally from the mouth of the hopper.

9. The combination of a hopper having an opening in the bottom thereof and a pair of semiconical centering-doors covering said opening and pivoted on axes at the sides of said opening.

10. The combination of a hopper having an opening in the bottom thereof, a pair of semiconical centering-doors covering said opening and pivoted on axes at the sides of said opening, and a fruit-sizing board located immediately beneath and having an aperture coaxial with said pair of doors.

11. The combination of a hopper having an opening in the bottom thereof, a pair of semiconical centering-doors covering said opening and pivoted on axes at the sides of said opening, said doors being counterweighted to hold them normally in raised position, and a series of pivoted sizing-boards directly below the contracted opening at the lower ends of said doors and mounted one below the other and having graded sizing-apertures coaxial with each other and with said pair of doors, whereby said doors are adapted to lower the fruit gently upon its proper sizing-aperture.

12. The combination of a hopper having a sloping floor and a circular opening in the bottom thereof, a longitudinally-divided funnel immediately below and coaxial with said opening, and a pair of horizontal counterweighted frame-pieces having the halves of said funnel respectively secured thereto and mounted to turn on axes parallel to the plane of division of said funnel and at opposite sides of said funnel and below the top thereof.

13. In a fruit-sizer, a hopper adapted to receive the fruit having an aperture in the bottom thereof, and a yielding hopper-bottom comprising pivoted doors having a central opening therebetween and covering said hopper-bottom, said doors being adapted to separate to enlarge the opening and allow a fruit of a given size to pass by the weight thereof, in combination with a series of boards pivoted at one side beneath said hopper and having graduated sizing-apertures therein coaxial with the hopper-bottom, and an ejector adapted to strike the fruit engaging with one of said boards from the lower side of the aperture and to eject it therefrom.

14. A fruit-sizer comprising a casing, a feed-aperture in the upper side thereof, a plurality of sizing-boards pivoted on a single axis at one side of said boards and adapted to turn independently, said boards having graduated sizing-apertures successively smaller downward therein, and guiding means for guiding fruit which catches in each of said apertures and rolls from the top of the board into a separate receptacle.

15. A fruit-sizer comprising a casing having an aperture in the top thereof, a plurality of boards pivotally mounted at one side on a single axis below said aperture and having successively smaller sizing-apertures therein coaxial with said first-named aperture, means for normally supporting said boards in a horizontal position, and a bumper projecting into the arc described by the center of said apertures and adapted to project up through the same and to strike fruit catching therein and eject it from said aperture.

16. A fruit-sizer comprising a casing having an aperture in the top thereof, a plurality of boards pivotally mounted at one side on a single axis below said aperture and having successively smaller sizing-apertures therein coaxial with said first-named aperture, means for normally supporting said boards in a horizontal position, a bumper projecting into the arc described by the center of said apertures and adapted to project up through the same and to strike fruit catching therein and eject it from said apertures, and guiding means adapted to guide the apples retained by each size of aperture into a different receptacle.

17. A fruit-sizer comprising a casing having an aperture in the upper side thereof, boards pivotally mounted below the same and having coaxial sizing-apertures therein and yieldably held in position to receive the fruit, and flaps or aprons attached to the free sides of said sizing-boards against which the fruit is adapted to strike and by which it is guided into the appropriate receptacle.

18. A fruit-sizer comprising a casing having an aperture in the upper side thereof, a plurality of boards pivoted on a single axis at one side thereof and having central coaxial successively smaller sizing-apertures therein, an oblique guide against which the upper board is adapted to strike forming a stop for its motion and a chute for the fruit caught by the upper board, a flap of flexible material suspended from the outer or free side thereof and hanging within said guide-board, and a flexible apron attached to the free edge of the second board and having its other end attached to the lower portion of said casing, whereby to form a separating-partition for the different sizes of fruit and a yielding chute to catch the third size of fruit and to guide it into its appropriate receptacle.

19. A fruit-sizer comprising a casing having an aperture in the upper side thereof, a plurality of boards pivoted on a single axis at one side thereof and having central coaxial successively smaller sizing-apertures therein, an oblique guide against which the upper board is adapted to strike forming a stop for its motion and a chute for the fruit caught by the upper board, a flap of flexible material suspended from the outer or free side thereof and hanging within said guide-board, a flexible apron attached to the free edge of the second board and having its other end attached to the lower portion of said casing, whereby to form a separating-partition for the different sizes of fruit, a yielding chute to catch the third size of fruit and to guide it into its appropriate vessel, and a bumper or ejector located beneath and in the travel of said sizing-apertures and adapted to strike against the fruit projecting through said apertures and eject it therefrom.

20. A fruit-sizer consisting of a casing formed of parallel side boards and top and bottom boards having apertures therein, the other sides of said casing being open, a feed-hopper supported on the upper side of said casing and adapted to direct the fruit through the aperture in the top board, a yielding mouth or bottom supported below said hopper comprising vertically-split portions adapted to yield apart to allow the passage of different sizes of fruit and cause it to fall centrally thereof, a pair of boards pivoted on a single transverse axis in the side boards of said casing and counterbalanced to hold them normally in a horizontal position, said boards having graduated sizing-apertures therein, the lower aperture being smaller than the upper and the upper board having its outer end turned obliquely upward to form a check for fruit rolling thereon, an oblique guide-board having its upper end projecting into the path of the free end of said upper board to form a stop therefor and a guide-chute for the fruit to direct it out at one side of the casing, a flap of flexible material suspended from the free side of the upper board and hanging normally within said guide-board and adapted to guide the intermediate size of fruit within said guide-board and down through the aperture in the bottom of the casing, and an apron of flexible material attached to the free side of the lower board and having its other end attached to the bottom board of the casing at the side opposite said guide-board.

21. A fruit-sizer consisting of a casing formed of parallel side boards, and top and bottom boards having apertures therein, the other sides of said casing being open, a feed-hopper supported on the upper side of said casing and adapted to direct the fruit through the aperture in the top board, a yielding mouth or bottom supported below said hopper comprising vertically-split portions adapted to yield apart to allow the passage of different sizes of fruit and cause it to fall centrally thereof, a pair of boards pivoted on a single transverse axis in the side boards of said casing and counterbalanced to hold them normally in a horizontal position, said boards having graduated sizing-apertures therein, the lower aperture being smaller than the upper and the upper board having its outer end turned obliquely upward to form a check for fruit rolling thereon, an oblique guide-board having its upper end projecting into the path of the free end of said upper board to form a stop therefor and a guide-chute for the fruit to direct it out at one side of the casing, a flap of flexible material suspended from the free side of the upper board and hanging normally within said guide-board and adapted to guide the intermediate size of fruit within said guide-board and down through the aperture in the bottom of the casing, an apron of flexible material attached to the free side of the lower board and having its other end attached to the bottom board of the casing at the side opposite said guide-board, and a bumper or ejector located below said sizing-boards and adapted to strike fruit projecting through the sizing-apertures in said boards and eject it therefrom.

22. A fruit-sizer consisting of a casing formed of parallel side boards and top and bottom boards having apertures therein, the other sides of said casing being open, a feed-hopper supported on the upper side of said casing and adapted to direct the fruit through the aperture in the top board, a yielding mouth or bottom supported below said hopper comprising vertically-split portions adapted to yield apart to allow the passage of different sizes of fruit and cause it to fall centrally thereof, a pair of boards pivoted on a single transverse axis in the side boards of said casing and counterbalanced to hold them normally in a horizontal position, said boards having graduated sizing-apertures therein, the lower aperture being smaller than the upper and the upper board having its outer end turned obliquely upward to form a check for fruit rolling thereon, an oblique guide-board having its upper end projecting into the path of the free end of said upper board to form a stop therefor and a guide-chute for the fruit to direct it out at one side of the casing, a flap of flexible material suspended from the free side of the upper board and hanging normally within said guide-board and adapted to guide the intermediate size of fruit within said guide-board and down through the aperture in the bottom of the casing, an apron of flexible material attached to the free side of the lower board and having its other end attached to the bottom board of the casing at the side opposite said guide-board, and a bumper or ejector yieldably supported upon and reciprocating in a socket in a cross-piece attached to said casing and having a cushioned head and a coiled spring surrounding the same, whereby to keep it yieldably pressed in its uppermost position.

23. A fruit-sizer comprising a pivoted plate having a sizing-aperture therein and a guiding-apron attached to the outer edge thereof, said plate being adapted to be tipped by the weight of a fruit placed thereon and a counterweight sufficient to sustain said board in horizontal position against the weight of said apron and a fruit falling thereon, but permitting said board to be tipped by a fruit caught by said aperture.

24. A fruit-sizer comprising a series of pivoted sizing-boards mounted one below the other and having coaxial sizing-apertures, flexible aprons attached to the free edges of the respective boards, and means for normally sustaining said boards in horizontal positions against the weight of said aprons but yielding to the weight of a fruit lodging in one of said apertures.

25. In a fruit-sizer, the combination of a series of pivoted sizing-boards having graded coaxial sizing-apertures, and a hopper having a distensible bottom above and coaxial with said sizing-apertures, whereby to deliver the fruit directly to the proper aperture.

In witness whereof we have hereunto set our hands in the presence of two witnesses.

WILLIAM MARSHALL BLACK.
HODGETTS FOLEY WORRALL.

Witnesses:
JOHN M. WALSH,
WALTER S. BEAZLEY.